United States Patent [19]

Paisley

[11] 4,297,140

[45] Oct. 27, 1981

[54] CERAMIC FOAM CEMENT

[75] Inventor: Robert J. Paisley, Corning, N.Y.

[73] Assignee: Corning Glass Works, Corning, N.Y.

[21] Appl. No.: 165,647

[22] Filed: Jul. 3, 1980

[51] Int. Cl.$^3$ ............................................. C04B 33/00
[52] U.S. Cl. ..................................... 428/310; 501/84; 501/153; 501/154; 264/261
[58] Field of Search ..................... 106/40 R, 73.4, 73.5

[56] References Cited

U.S. PATENT DOCUMENTS

| | | | |
|---|---|---|---|
| 3,272,686 | 9/1966 | Smith et al. ...................... | 106/40 R |
| 3,634,111 | 1/1972 | Foster et al. ...................... | 106/40 R |
| 3,885,977 | 5/1975 | Lachman et al. ................... | 106/73.4 |
| 3,929,494 | 12/1975 | Veres ................................ | 106/40 R |
| 4,191,583 | 3/1980 | Armistead et al. ................. | 106/73.4 |

*Primary Examiner*—James Poer

*Attorney, Agent, or Firm*—Richard N. Wardell

[57] ABSTRACT

Foamable particulate cement is capable of forming sintered cordierite foamed ceramic masses. It consists essentially, by weight, of 1–40% cordierite grog, 99–60% ceramic base material and foaming agent, such as SiC. The ceramic base material is raw ceramic material that has an analytical molar composition consisting essentially of about 1.7–2.4 MO . 1.2–2.4 Al$_2$O$_3$ . 4.5–5.4 SiO$_2$ wherein MO comprises about 0–55 mole % MgO and at least 45 mole % MnO. The grog is ceramic material that has been previously fired and comminuted, and that has an analytical molar composition consisting essentially of about 1.7–2.4 RO . 1.9–2.4 Al$_2$O$_3$ . 4.5–5.2 SiO$_2$ wherein RO comprises MnO in an amount of 0 mole % up to a mole % that is about 20 mole % lower than the mole % of MO that is MnO and the balance is substantially MgO.

15 Claims, No Drawings

CERAMIC FOAM CEMENT

BACKGROUND OF THE INVENTION

In fabricating products or structures comprising open celled or honeycomb ceramic components, it is sometimes necessary to utilize a ceramic cement to bond a plurality of such components together or to solid ceramic components, or to fill or plug selected cells (in whole or in part) within such components.

For joining lithium aluminosilicate ceramic components having low coefficients of thermal expansion, U.S. Pat. Nos. 3,189,512 and 3,634,111 disclose foaming ceramic cements comprising SiC foaming agent mixed lithium aluminosilicate ceramic material to form foamed ceramic cement bonds with and to fill the spaces between adjacent surfaces of those components. Thus, the components and the foamed cement have comparable properties (e.g. low coefficients of thermal expansion, chemical durability, etc.)

In recent years, occasions have arisen where it has been desirable to form the products or structures of cordierite ceramics also having low coefficients of thermal expansion because the cordierite ceramics provide properties (e.g. thermal and chemical) which are more beneficial than those of lithium aluminosilicate ceramics. Thus, for example, cordierite ceramic honeycomb structures have higher use (melting point) temperatures and are more resistant to sodium present in gas streams flowed through the cells of such structures (as in industrial heat recovery wheels). It is also desirable, then, to use foaming ceramic cements with these cordierite components that develop foamed cordierite cement bonds or plugs of comparable beneficial properties.

It is further desirable to form the cement mixture from unfired ceramic batch materials so as to avoid the expenditure of extra energy for prefiring or fusing such materials and from such materials as will form manganese cordierite ($2MnO \cdot 2Al_2 \cdot 5SiO_2$), which has a distinctly lower melting point than other types of cordierites but that is still suitably high for the desired uses. However, attempts to formulate foaming cements based on SiC foaming agent mixed with wholly raw (unfired) ceramic batch materials of combined composition designed to yield manganese cordierite resulted in foamed sintered clement masses that did not contain any significant codierite crystal phase. Rather, those resultant fired cements comprised mainly mullite and sometimes other noncordierite silicate phases lacking the desirable characteristics (e.g. durability) of cordierite. Similar undesirable results of failing to produce cordierite foamed cement were found with mixtures of silicon carbide with devitrifiable glass frit of the type shown in U.S. Pat. No. 4,191,583 to form Mg-Mn cordierite glass-ceramic when not mixed with SiC.

SUMMARY OF THE INVENTION

It has now been discovered that a foamable particulate ceramic cement capable of forming a sintered cordierite foamed ceramic mass can be made by seeding ceramic base material of controlled composition with cordierite grog of another controlled composition and adding thereto a foaming agent in an effective amount to effect foaming of the cement upon firing to produce the foamed ceramic mass.

The cement of the present invention consists essentially, by weight, of 1–40% cordierite grog, 99–60% ceramic base material and foaming agent. The base material is raw ceramic material that has an analytical molar composition consisting essentially of about 1.7–2.4 $MO \cdot 1.2$–2.4 $Al_2O_3 \cdot 4.5$–5.4 $SiO_2$ wherein MO comprises, as mole % of MO, about 0.55% MgO and at least 45% MnO. The grog is ceramic material that has been previously fired and comminuted, and that has an analytical molar composition consisting essentially of about 1.7–2.4 $RO \cdot 1.9$–2.4 $Al_2O_3 \cdot 4.5$–5.2 $SiO_2$ wherein RO comprises, as mole % of RO, MnO in an amount of 0% up to a mole % that is about 20 mole % lower than the mole % of MO that is MnO and the balance is substantially MgO. Minor portions of MgO in either or both of MO and RO can be replaced by equal molar amounts of other oxides such as NiO, CoO, FeO and $TiO_2$ as noted in U.S. Pat. No. 3,885,977, which is incorporated herein by reference. Foaming agent can be selected from a variety of substances that decompose to give off gas at about the foaming temperature of the cement, i.e. the temperature at which the grog and base material are in a softened condition adequate to be foamed by the gas. Among such substances are compounds such as carbides, carbonates, sulfates, etc., preferably of cations that are in the grog and/or base material. Silicon carbide is the preferred foaming agent and can be employed in any effective amount (usually at least 0.25 wt. %) up to a practical amount of about 5% by weight of grog plus base material. Larger amounts can be employed without additional benefit, but they dilute the amount of ceramic in the foamed mass. Generally 1–2 wt.% SiC (by weight of grog plus base material) is preferred.

To insure thorough cordierite crystallization in the foamed ceramic masses, it is advantageous for the grog in the cement to be at least 5 wt.% and correspondingly for the base material to not exceed 95 wt.%. Preferred proportions are 5–20 wt.% grog and 95–80 wt.% base material.

While the invention can broadly utilize base compositions within the aforesaid molar composition range embracing both the stoichiomeric cordierite area and the nonstoichrometric eutectic cordierite area, it is preferred to use base compositions of the generally stoichiometric type having an analytical molar composition consisting essentially of about 1.7–2.4 $MO \cdot 1.9$–2.4 $Al_2O_3 \cdot 4.5$–5.2 $SiO_2$ wherein MO is as previously stated. Most preferably, such molar composition is about 1.8–2.1 $MO \cdot 1.9$–2.1 $Al_2O_3 \cdot 4.9$–5.2 $SiO_2$ and MO is wholly MnO.

The requisite minimum difference of about 20 mole % for MnO in MO and RO provides the grog with adequately higher melting point vis a vis melting point of the base material so as to insure proper cordierite crystallization seeding effect by the grog at foaming temperature. To enhance such effect, it is preferred to have MO of the base composition comprise not more than about 15 mole % MgO.

The most preferable grog has an analytical composition of about 1.8–2.1 $RO \cdot 1.9$–2.1 $Al_2O_3 \cdot 4.9$–5.2 $SiO_2$, and RO comprises 8–12 mole % MnO and the balance MgO.

If desired, optional customary fluxes may be included in the cement in minor amounts up to 5 wt.% or so of the grog plus base material. Such fluxes are illustratively disclosed in U.S. Pat. Nos. 3,189,512 and 3,634,111, which are incorporated herein by reference.

The present invention also encompasses ceramic structures embodying the novel sintered cordierite foamed ceramic mass and the method providing such mass in the structures. The structure broadly comprises at least two closely spaced cordierite ceramic surfaces having the mass in the space between and bonded to those surfaces. In the method, the cement is disposed between such surfaces, then the structure with the cement so disposed is fired to foaming temperature in the range of about 1160°–1325° C. and thereafter cooled with the cement converted to the foamed ceramic mass. Preferably the foaming temperature is in the range of 1170°–1250° C., especially for attaining foamed ceramic mass that is substantially impervious to fluids. Lower temperatures fail to develop an adequate foaming of the cement. Also, it is desirable to fire to the foaming temperature at an average rate of at least about 100° C. per hour (preferably at least about 200° C. per hour) to avoid the possible adverse effect of much slower (e.g. 50° C./hr.) heating rates that may cause loss of foaming agent gas before the ceramic constituents of the cement are soft enough to be foamed.

DETAILED DESCRIPTION

A series of foamable particulate ceramic cement samples according to this inventon were prepared by thoroughly mixing the batch materials as shown in Table I to form pastes of these samples.

The analytical molar composition of the combined raw base materials of clay, silica and $MnCO_3$ for Samples 1–4 and 6 was 1.84 $MnO \cdot 2.04$ $Al_2O_3 \cdot 5.11$ $SiO_2$. Such composition for Sample 5 was 2.36 $MnO \cdot 1.29$ $Al_2O_3 \cdot 5.35$ $SiO_2$.

Hold about 10 hours at 1405° C.

Cool 1405° C. to room temperature within about 24 hours.

The Mg cordierite grog (in the batch form the Mn-Mg cordierite grog) was made of the following batch composition (in weight % of the total ceramic batch materials):

| | |
|---|---|
| Georgia-Kaolin Hydrite MP clay (APS 9.7) | 25.15 |
| Georgia-Kaolin Glomax LL clay (APS 1.9) | 21.17 |
| Pfizer MP 96-28 talc (APS 20) | 40.21 |
| Alcoa A-2 alumina (APS 5.8) | 13.47 |
| Methyl cellulose binder/plasticizer | 4.0 |
| Alkali stearate extrusion aid | 0.5 |
| Distilled water plasticizer | 32.5 |

This Mg cordierite grog was fired generally in accordance with the same firing schedule as for the Mn-Mg cordierite grog, except that the maximum temperature was 1425° C.

The analytical molar composition of Mn-Mg cordierite grog was 2.03 $RO \cdot 20.4$ $Al_2O_3 \cdot 4.92$ $SiO_2$ wherein RO consisted of 9.7 mole % MnO and 90.3 mole % MgO.

Pieces of ceramic honeycomb monolith were extruded in accordance with U.S. Pat. Nos. 3,790,654 and 3,919,384 from the same batch composition as described for the Mn-Mg cordierite grog. Those extruded green honeycomb bodies were then fired in the manner as disclosed in U.S. Pat. No. 3,899,326 and in accordance with the same firing schedule as described for the Mn-Mg cordierite grog. A series of pairs of these hon-

TABLE I

| Batch Compositions - weight % of total ceramic materials (excluding SiC) | | | | | | |
|---|---|---|---|---|---|---|
| | Samples | | | | | |
| Batch materials[a] | 1 | 2 | 3 | 4 | 5 | 6 |
| Georgia-Kaolin Kaopaque 10 clay (APS 10) | 60.77 | 57.57 | 51.17 | 38.38 | 25.04 | 57.57 |
| Penn. Glass Sand Minusil silica (APS 5) | 7.43 | 7.04 | 6.26 | 4.69 | 12.57 | 7.04 |
| Baker reagent $MnCO_3$ powder | 26.80 | 25.39 | 22.57 | 16.93 | 22.39 | 25.39 |
| Mn—Mg cordierite grog (95 wt. % - 200 mesh) | 5.0 | 10.0 | 20.0 | 40.0 | 40.0 | 10.0 |
| Norton RA 600 SiC (600 grit) | 1.96 | 1.91 | 1.80 | 1.60 | 1.60 | 1.0 |
| Methyl cellulose binder/plasticizer | 2.4 | 2.3 | 2.0 | 1.5 | 1.5 | 2.0 |
| Distilled water plasticizer[c] | | | 50–100 | | | |
| Foaming temperature-°C. | 1170 | 1185 | 1210 | 1250 | 1250 | 1185 |
| Coefficient of Thermal Expansion × $10^{-7}/°C$. | — | 19.6 | 17.2 | 17.7 | 27.3 | 17.7 |

[a]APS means average particle size in micrometers.
[b]Over 25–1000° C.
[c]Amounts varied among different trials of each Sample to provide different cement viscosities suitable for each cementing trial.

The Mn-Mg cordierite grog in the cement batches in Table 1 was a dense ceramic product of the type described and claimed in copending application Ser. No. 165,111 of Irwin M. Lachman and entitled Dense Cordierite Containing Manganese, which was filed on the same date as this application and is assigned to the assignee of this application. In particular, the grog was made of the following batch composition (in weight % of the total ceramic batch materials):

| | |
|---|---|
| Mg Cordierite grog (95%-200 mesh) | 84.48 |
| Georgia-Kaolin Kaopaque 10 clay (APS 10) | 10.00 |
| Baker reagent $MnCO_3$ powder | 4.15 |
| Penn. Glass Sand Minusil silica (APS 5) | 0.78 |
| Pfizer MP 96-28 talc (APS 20) | 0.59 |
| Methyl cellulose binder/plasticizer | 4.0 |
| Alkali stearate extrusion aid | 0.5 |
| Distilled water plasticizer | 26.0 |

This Mn-Mg cordierite grog was fired generally in accordance with the following firing schedule:

80° C. to 1405° C. within about 60 hours.

eycomb pieces were cemented together by applying the sample pastes described in Table 1 to the cordierite surfaces of these pieces that were to be joined and then pressing those paste-coated surfaces together. These assembled pairs of cemented pieces were dried in air at least 22°–75° C., then fired at about 300° C./hr. to the foaming temperature set forth in Table 1, held at the foaming temperature for about one hour and thereafter cooled at furance rate to at least 200° C., at which time the foam cemented pieces were removed from the furnace for further cooling in ambient air atmosphere. The coefficients of thermal expansion (CTE) of the foamed cement samples are set forth in Table 1, which are closely similar to the typical CTE of $18 \times 10^{-7}/°C$. (25°–1000° C.) for the pieces except the CTE of Sample 5.

All of those sintered foamed cement samples had a substantially wholly cordierite crystal structure.

Upon subjecting the foam cemented pieces to a cycling thermal shock test of 50 cycles of heating from 250° C. to 800° C. in 3 minutes and then cooling back to 250° C. in 3 minutes, the foam cemented pieces with cement Samples 1–4 and 6 showed good resistance to thermal shock whereas the foam cemented pieces with cement Sample 5 showed moderate resistance to thermal shock. However, cement Sample 5 should serve well with pieces having CTE more closely similar to the CTE of foamed Sample 5 so as to exhibit good resistance to thermal shock.

Foamable cement Sample 6 has also been used to plug the end portions of cells in extruded ceramic honeycomb bodies made of the same and similar compositions and fired in the same manner as the Mg cordierite grog previously described. In those cases, the Mn-Mg cordierite grog was 95 wt. %–325 mesh, and the cement batch was formed with 2.0 wt. % methyl cellulose and 70.0 wt. % water to provide a paste that was injected into the cell ends, between the surfaces of opposed cell walls, by means of an air pressure operated sealant or caulking gun with an appropriately shaped nozzle. Those bodies with the green plugs were then fired generally in accordance with the following typical firing schedule:

Room temperature to 1210° C. within about 6 hours.
Hold about 30 minutes at 1210° C.
Cool 1210° C. to room temperature within about 18 hours.

The cement foamed during firing to develop a sintered cordierite mass having good sealing to the cell walls and being generally impervious to fluids.

The particle sizes of cordierite grog and SiC or other foaming agent in the cement can be varied as desired. For example, the grog may be a coarse as −20 mesh. All mesh sizes herein are according to the U.S. Standard Sieve series.

We claim:

1. A foamable particulate ceramic cement capable of forming a sintered cordierite foamed ceramic mass and consisting essentially, by weight, of:
   1–40% cordierite grog,
   99–60% ceramic base material and an effective amount of a foaming agent to effect foaming of the cement upon firing to produce the foamed ceramic mass,
the base material being raw ceramic material that has an analytical molar composition consisting essentially of about:
   1.7–2.4 MO·1.2–2.4 $Al_2O_3$ ·4.5–5.4 $SiO_2$ wherein MO comprises, as mole % of MO, about 0–55% MgO and at least 45% MnO, and
the grog being ceramic material that has been previously fired and comminuted, and that has an analytical molar composition consisting essentially of about:
   1.7–2.4 RO·1.9–2.4 $Al_2O_3$ ·4.5–5.2 $SiO_2$ wherein RO comprises, as mole % of RO, MnO in an amount of 0% up to a mole % that is about 20 mole % lower than the mole % of MO that is MnO and the balance is substantially MgO.

2. Cement of claim 1 wherein the foaming agent is SiC in an amount up to about 5% by weight of grog plus base material.

3. Cement of claim 2 wherein SiC is at least 0.25% by weight of grog plus base material.

4. Cement of claim 3 wherein the grog is at least 5 wt. % and the base material is not more than 95 wt. %.

5. Cement of claim 3 wherein the analytical molar composition of the base material is about:
   1.7–2.4 MO·1.9–2.4 $Al_2O_3$ ·4.5–5.2 $SiO_2$.

6. Cement of claim 5 wherein the grog is 5–20 wt.% and the base material is 95–80 wt.%.

7. Cement of claim 6 wherein SiC is at least 1 wt.%.

8. Cement of claim 7 wherein MO comprises not more than about 15 mole % MgO.

9. Cement of claim 7 or 8 wherein the analytical molar composition of the grog is about:
   1.8–2.1 RO·1.9–2.1 $Al_2O_3$ ·4.9–5.2 $SiO_2$ and MO is wholly MnO.

10. Cement of claim 9 wherein SiC is not more than 2 wt.%.

11. Cement of claim 9 wherein the analytical molar composition of the base material is about:
    1.8–2.1 MO·1.9–2.1 $Al_2O_3$ ·4.9–5.2 $SiO_2$ and MO is wholly MnO.

12. A ceramic structure comprising at least two closely spaced cordierite ceramic surfaces having a sintered cordierite foamed ceramic mass in the space between and bonded to those surfaces, and the foamed ceramic mass being formed of the cement of claim 1.

13. A method of providing a sintered cordierite foamed ceramic mass between and bonded to at least two closely spaced cordierite ceramic surfaces of a ceramic structure, which method comprises:
    disposing the cement of claim 1 between the surfaces,
    firing the structure with the cement so disposed to foaming temperature in the range of about 1160°–1325° C., and
    thereafter cooling the structure with the cement converted to the foamed ceramic mass.

14. The method of claim 13 wherein the foaming temperature is in the range of 1170°–1250° C.

15. The method of claim 13 or 14 wherein firing to foaming temperature is at an average rate of at least about 1000° C. per hour.

* * * * *